US009224550B2

(12) United States Patent
Chou

(10) Patent No.: US 9,224,550 B2
(45) Date of Patent: Dec. 29, 2015

(54) CORROSION RESISTANT BARRIER FORMED BY VAPOR PHASE TIN REFLOW

(71) Applicant: TYCO ELECTRONICS CORPORATION, Berwyn, PA (US)

(72) Inventor: George Jyh-Shann Chou, Mechanicsburg, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 270 days.

(21) Appl. No.: 13/726,744

(22) Filed: Dec. 26, 2012

(65) Prior Publication Data
US 2014/0178711 A1 Jun. 26, 2014

(51) Int. Cl.
H01H 11/04 (2006.01)
H01H 1/023 (2006.01)
C23C 18/16 (2006.01)
B32B 15/01 (2006.01)
C23C 18/32 (2006.01)
C23C 18/42 (2006.01)
C25D 3/12 (2006.01)
(Continued)

(52) U.S. Cl.
CPC .............. H01H 11/045 (2013.01); B32B 15/01 (2013.01); C23C 18/165 (2013.01); C23C 18/1637 (2013.01); C23C 18/1692 (2013.01); C23C 18/32 (2013.01); C23C 18/42 (2013.01); C25D 3/12 (2013.01); C25D 3/30 (2013.01); C25D 3/48 (2013.01); H01H 1/023 (2013.01); H01H 1/025 (2013.01); H01H 1/0231 (2013.01); H01H 2011/046 (2013.01); Y10T 428/12715 (2015.01); Y10T 428/12722 (2015.01)

(58) Field of Classification Search
CPC .............. H01H 11/045; H01H 1/0231; H01H 2011/046; C23C 18/1651; Y10T 428/12715
USPC ................................... 427/125; 428/647, 648
See application file for complete search history.

(56) References Cited

U.S. PATENT DOCUMENTS 4,871,109 A * 10/1989 Kalota et al. ............... 228/180.1
5,294,486 A   3/1994 Paunovic et al.
(Continued)

FOREIGN PATENT DOCUMENTS

EP    1915039 A2    4/2008
JP    61-202786 A   9/1986
(Continued)

OTHER PUBLICATIONS

International Search Report, International Application No. PCT/US2012/033886, mailed Jun. 1, 2012.

Primary Examiner — William Phillip Fletcher, III
Assistant Examiner — Jose Hernandez-Diaz

(57) ABSTRACT

A copper substrate for use as a contact having Sn plating, nickel plating and Au plating overlying the substrate. A combination of Sn plating is applied over a copper substrate; nickel plating is applied over the Sn plating; and Au plating is applied over the nickel plating to form a stack. The stack is then processed by a vapor phase Sn reflow step that results in the formation of intermetallics and eliminates stannous oxide layers that may otherwise form on the tin layer. The intermetallic layers provide excellent corrosion resistance, and serve as diffusion barriers to prevent the further migration of either Ni atoms or Cu atoms into the Sn, and Sn atoms outwardly into either the Ni or the Cu. Regardless of the thickness, the interfaces are substantially free of oxides, in particular tin oxide, and not prone to delamination.

20 Claims, 4 Drawing Sheets

(51) Int. Cl.
  *C25D 3/30* (2006.01)
  *C25D 3/48* (2006.01)
  *H01H 1/025* (2006.01)
  *C25D 3/00* (2006.01)

(56) References Cited

U.S. PATENT DOCUMENTS

| | | |
|---|---|---|
| 5,360,991 A | 11/1994 | Abys et al. |
| 6,130,479 A | 10/2000 | Chalco et al. |
| 6,319,741 B1 | 11/2001 | Izumi et al. |
| 6,336,979 B1 | 1/2002 | Sugawara et al. |
| 6,403,234 B1 | 6/2002 | Kodama et al. |
| 6,451,449 B2 | 9/2002 | Asakura et al. |
| 6,872,470 B2 | 3/2005 | Minamikawa |
| 7,462,926 B2 * | 12/2008 | Fu et al. .................. 257/677 |
| 7,495,333 B2 | 2/2009 | Miyazaki et al. |
| 8,013,428 B2 | 9/2011 | Hooghan et al. |
| 8,142,906 B2 | 3/2012 | Taira et al. |
| 2001/0008709 A1 | 7/2001 | Asakura et al. |
| 2003/0022017 A1 | 1/2003 | Minamikawa |
| 2006/0237097 A1 * | 10/2006 | Lau et al. .................. 148/242 |
| 2007/0126096 A1 | 6/2007 | Fu et al. |
| 2009/0061253 A1 | 3/2009 | Yoshida et al. |
| 2009/0291321 A1 | 11/2009 | Hooghan et al. |
| 2010/0175908 A1 | 7/2010 | Okamoto et al. |
| 2010/0263921 A1 | 10/2010 | Nakahara et al. |
| 2011/0008646 A1 | 1/2011 | Cahalen et al. |
| 2011/0201159 A1 * | 8/2011 | Mori et al. .................. 438/123 |
| 2011/0294368 A1 | 12/2011 | Nakata et al. |

FOREIGN PATENT DOCUMENTS

| | | |
|---|---|---|
| JP | 06-200395 | 7/1994 |
| JP | 08-055521 A | 2/1996 |
| JP | 2001-342593 A | 12/2001 |
| WO | WO-2009/043536 A1 | 4/2009 |

* cited by examiner

CORROSION RESISTANT BARRIER FORMED BY VAPOR PHASE TIN REFLOW

FIELD OF THE INVENTION

The present invention is directed to electrical conductors, and specifically to elimination of delamination in electrical contacts.

BACKGROUND OF THE INVENTION

Electrical conductors are utilized in various applications from transmitting data signals to providing a connection across which electrical current may flow. Contacts between two transmitters of electrical current or data signals allow the electrical current or data signals to be transmitted from one conductor to another.

Prior art connectors have included nickel-gold plated copper conductors. However, pitting corrosion has occurred in such constructions that have resulted in the deterioration of the contacts, which in turn has adversely affected electrical performance. While the nickel layer has been used as a buffer layer between the outer gold plating layer and the copper substrate, pitting corrosion occurs through the nickel-gold layer due to pin holes extending through the gold plating layer and nickel plating layer.

One solution to the pitting problem has been to apply a seal plating layer between the nickel layer and the copper layer. The seal plating layer preferably has been tin (Sn) applied over the copper substrate and in contact with the nickel (Ni) plating layer. After application, the Sn forms an intermetallic with Cu as well as with Ni at its interface with each of these materials. The intermetallic layers are formed either as a result of solid state interdiffusion, which may occur either at room temperature or as a result of an elevated temperature heat treatment, or as a result of Sn reflow. Intermetallic materials are very corrosion resistant, but are also significantly harder and less ductile than the copper substrate over which the Sn is applied, or the Ni or nickel alloys applied over the Sn. The thickness of the intermetallic materials formed by heat treatment or Sn reflow creates an intermetallic layer that is also brittle. Thus, while this solution has solved the problem of pitting, delamination occurs at the thick and brittle intermetallic layer between Ni and Sn, and from the readily formed thin Sn oxide layer from the exposure of Sn to the atmosphere between the Sn and Ni plating operations.

What is needed is a solution to both the delamination problem and to the pitting problem created by the use of Au/Ni applied over copper substrates or Au/Ni/Sn applied over copper substrates.

SUMMARY OF THE INVENTION

The present invention utilizes a combination of Sn plating applied over a copper substrate. A nickel plating layer is applied over the Sn plating. A gold plating layer is applied over the nickel plating to form a stack. The stack is then processed so that the Sn solders the Ni to the Cu. The processing includes a vapor phase Sn reflow step that results in the formation of very thin layers of intermetallics. The intermetallic layer between the copper and the tin is very thin, and the intermetallic layer between the nickel and the Sn is likewise very thin. The intermetallic layers provide excellent corrosion resistance as expected, and serve as diffusion barriers to prevent the migration of either Ni atoms or Cu atoms into the Sn, and Sn atoms outwardly into either the Ni or the Cu. While intermetallic layers formed by vapor phase Sn reflow are hard, they may be significantly less thick than the intermetallic layers formed by a diffusion heat treatment or by Sn reflow. Regardless of the thickness, the interfaces are substantially free of oxides, in particular tin oxide, that adversely affects bonding between the Sn layer and both Ni and Cu. The thin tin oxide between Sn and Ni is quickly dissolved into the molten Sn during Sn reflow. The result is a more compliant layer at the intermetallic interface between the Sn and Ni. Because the layer is more compliant, delamination between Ni and Sn is eliminated.

Processing of the Au/Ni/Sn layers over the Cu substrate provides the desirable thin intermetallic layers of Ni/Sn, primarily $Ni_3Sn_4$ intermetallics and to a lesser extent $Ni_3Sn$ and $Ni_3Sn_2$ intermetallics at the Ni/Sn interface and thin intermetallic layers of SnCu, primarily $Cu_6Sn_5$ intermetallic and to a lesser extent $Cu_3Sn$ intermetallic at the Sn/Cu interface. Vapor phase reflow permits the formation of the thin intermetallic layers that do not exhibit the brittleness of the thicker prior art intermetallic layers that leads to delamination.

The processing of the present invention first requires providing a clean Cu substrate. Sn plating is then applied over and in contact with the Cu substrate. Ni plating is then applied over the Sn layer. A thin layer of gold (Au) is then applied over the Ni. The layers of plating are then subjected to a vapor phase reflow operation in which the Sn layer is subjected to the reflow operation. The vapor phase reflow operation effectively solders Ni to Cu. The vapor phase reflow operation forms a thin layer of Ni/Sn intermetallic and also dissolves any thin Sn oxide into molten Sn. Vapor phase reflow provides consistent heating across the contact and limits the maximum temperature to the boiling point of the vapor phase fluid utilized in the vapor phase process. The vapor phase reflow uses a condensation method of heat transfer, which eliminates uneven heating of the contact, such as hot spots and cold spots. The condensation method uses a saturated vapor to transfer heat, the vapor phase being more uniform, transferring heat evenly to all surfaces of the contacts. Importantly, the vapor phase reflow process transfers heat faster than other methods of heat transfer processing, such as infrared and convection oven heating. The result is that heating of the contact can be carefully controlled so that soldering or brazing can be accomplished at a carefully controlled temperature for a controlled period of time. This in turn may be used to limit the thickness of the intermetallics formed at the Cu/Sn interface, and importantly, at the Ni/Sn interface if desired.

An advantage of the present invention is that delamination of the contact plating at the intermetallic interfaces, and in particularly, at the Ni/Sn interface is eliminated.

Because of the careful control of the temperature, the time at temperature, and the atmosphere in which vapor phase reflow occurs, not only can the thickness of the intermetallics be carefully controlled, but also impurities such as oxides can be substantially removed at the Sn interfaces between Ni and Cu layers by dissolving the impurities into molten Sn. Furthermore, the vapor phase reflow process provides a substantially uniform transfer of heat to all surfaces of the contact, so that there is uniformity of heat across the contact regardless of its geometry.

Additionally, because the temperature is carefully controlled across the contact, hot spots or cold spots and their associated uniformity are eliminated.

Other features and advantages of the present invention will be apparent from the following more detailed description of the preferred embodiment, taken in conjunction with the

DETAILED DESCRIPTION OF THE INVENTION

Figure 1:
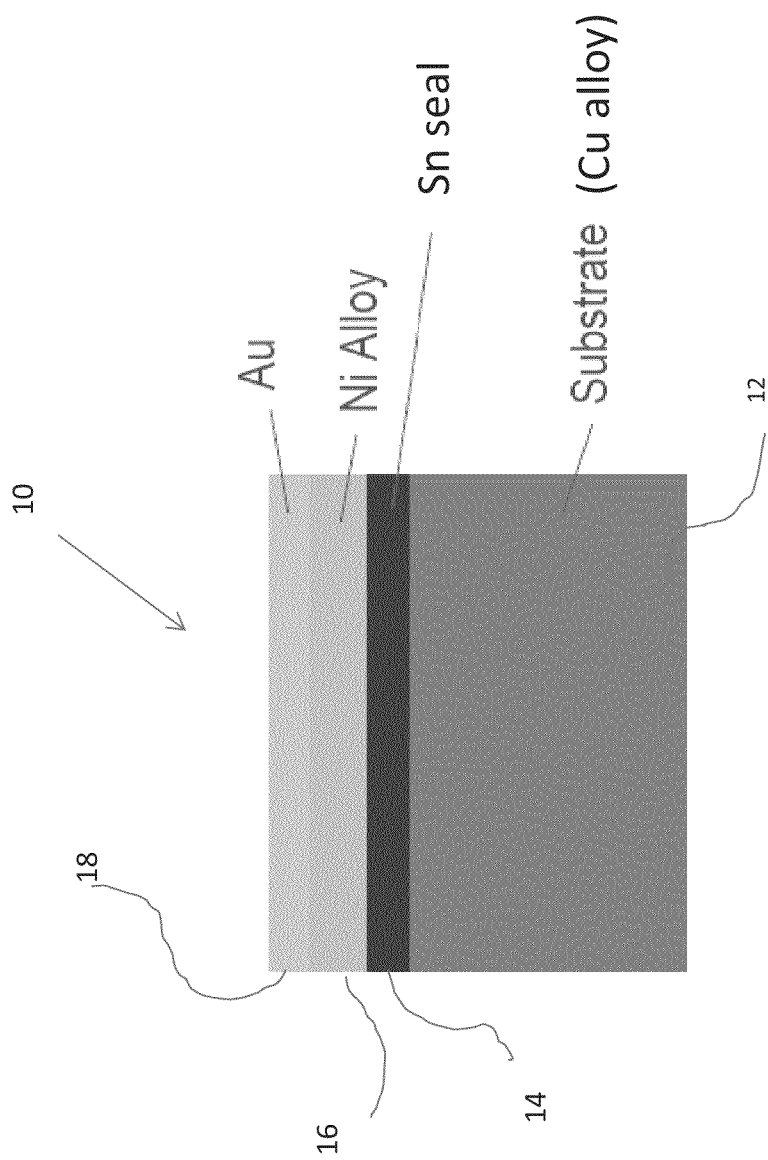
FIG. 1 represents a cross-section of a typical as-plated contact with a layer intermediate a nickel layer and the substrate, in the as-plated condition.

Reliable contacts are provided by the present invention. In particular, the processing of the present invention provides a contact comprising a substrate, a layer of tin overlying the substrate, a layer of nickel overlying the tin and a layer of gold overlying the nickel. The as-plated contact 10, before processing, is depicted in FIG. 1. A layer of Sn 14 is applied over and in contact with copper substrate 12. The layer of tin is applied to a thickness of 5-130 μin. (0.000005-0.000130 inches). A layer of Ni 16 is applied over and in contact with Sn layer 14. The layer of Ni is applied to a thickness of 35-150 μin. (0.000035-0.000150 inches). A layer of Au 18 is applied over and in contact with Ni layer 16. The layer of Au is applied to a thickness of about 5-15 μin. (0.000005-0.000015 inches). Full metallurgical bonding between adjacent layers and the substrate is not developed in the as-plated contact 10, and further processing is required.

According to the present invention, metallurgical bonding is developed by a vapor phase reflow operation. Generally, vapor phase reflow involves heating a component above its melting temperature using a fluid having a known vaporization temperature above the melting temperature of the component. In this invention, the component comprises Sn, and vapor phase reflow heats Sn above its melting temperature. The vaporization of the fluid is at a substantially uniform temperature that is very difficult to exceed. The vapor phase reflow operation itself involves vaporization of a fluid. The vapor phase is inert and may be oxygen-free when the enclosure containing the vapor phase is properly designed to contain the vapor while sealing out oxygen. Oxygen can be removed by introduction of a non-oxidizing gas to displace the oxygen or by pulling vacuum prior to introduction of the vapor phase. This process step also delivers a consistent heating across the contact, while limiting absolute maximum temperature. While any vapor phase reflow fluid may be utilized, preferred vapor phase reflow fluids are perfluorinated fluids. These fluids are non-corrosive, non-flammable and non-toxic. They leave no residue after evaporation. Importantly, the vapor phase reflow process transfers heat faster than other heating processes such as infrared and convection oven heating, even in controlled atmospheres. As a result, plated contact 10 can be heated to a uniform temperature for a short period of time, while obtaining uniform heating across the contact. Two preferred perfluorinated fluids include HS/240 and HS/260 Perfluoropolyether (PFPE) fluids available from Solvay Solexis, having a place of business at 4883 E. La Palma Ave. #505, Anaheim, Calif. 92807. 240 and 260 refer to the targeted reflow temperatures of each respective fluid 240° C. (464° F.) and 260° C. (500° F.).

Processing of the Au/Ni/Sn layers over the Cu substrate provides the desirable intermetallic layers of Ni/Sn, primarily $Ni_3Sn_4$ intermetallics and to a lesser extent $Ni_3Sn$ and $Ni_3Sn_2$ intermetallics at the Ni/Sn interface and thin intermetallic layers of SnCu, primarily $Cu_6Sn_5$ intermetallic and to a lesser extent $Cu_3Sn$ intermetallic and at the Sn/Cu interface. Vapor phase reflow permits the elimination of any thin Sn oxide and the formation of the thin intermetallic layers that do not exhibit the brittleness of the thicker intermetallic layers of the prior art that leads to delamination.

It is known that tin rapidly forms a layer of tin oxide (stannous oxide) after even brief exposures to air. Prior art processing utilizing acid activators still expose the Sn layer to air after applying the activators, resulting in the formation of stannous oxide, even though the stannous oxide layer may be very thin, as low thin as angstrom thicknesses. Thus, the stannous oxide layer is detrimental to formation of intermetallics, as the stannous oxide acts as a diffusion barrier, and a barrier for a good adhesion between Sn and Ni. Even when the Sn layer is activated, such as by processing that includes acid activators, the stannous oxide layer forms on the tin outer layer before the Ni layer can be deposited. The stannous oxide layer forms a barrier for interdiffusion of Ni and Sn. Even though the stannous oxide layer may not uniformly cover the surface of the tin plating, sufficient tin oxide remains to compromise the formation of intermetallic layers and serve as initiation sites for delamination.

Figure 2:
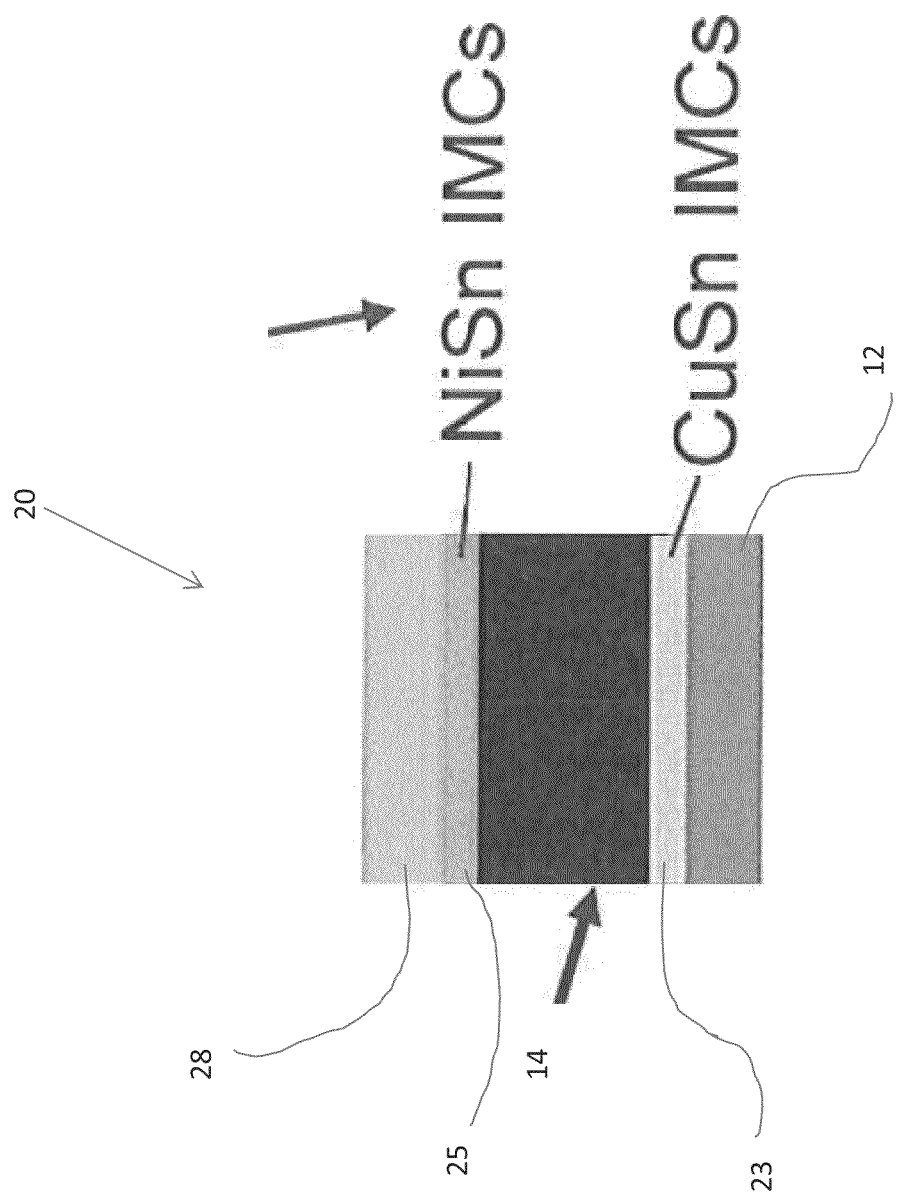
FIG. 2 represents a cross-section of a contact after the vapor phase reflow operation.

A cross-section of a plated contact, after vapor phase reflow, is represented in FIG. 2. FIG. 2 illustrates the effect of the vapor phase reflow on the contact and is not meant to represent the actual dimensions. As is illustrated in FIG. 2, a CuSn intermetallic lamina 23 is formed between Cu substrate 12 and Sn layer 14, and a NiSn intermetallic lamina 25 is formed between Sn layer 14 and Ni layer 28. The Cu/Sn intermetallic lamina 23 formed at the previous Cu/Sn interface is about 0.05 microns ($1.968 \times 10^{-6}$ inches) thick, while the Ni/Sn intermetallic lamina 25 formed at the previous Ni/Sn interface 25 is about 0.01 micron (about $4 \times 10^{-7}$ inches) thick. Each interface is formed by the interdiffusion of Sn into either Cu or Ni respectively and Cu or Ni respectively into Sn. The interdiffusion of Cu and Sn forms $Cu_6Sn_5$, with the possible formation of $Cu_3Sn$ in Cu-rich areas of the intermetallic lamina 23 close to the Cu substrate. Similarly, the interdiffusion of Ni and Sn forms $Ni_3Sn_4$, but other intermetallics such a $Ni_3Sn_2$ may form in Ni-rich areas of the intermetallic lamina 25 close to the applied Ni layer. After completion of the vapor phase reflow operation, a substantial portion of Sn layer 14 remains between intermetallic lamina 23 and intermetallic lamina 25. It will be understood that the remaining thickness of the Sn layer 14, after vapor phase reflow, will depend upon the initial thickness of Sn layer 14, the temperature of the vapor phase reflow operation and the time at elevated temperature. The interaction of Ni and Au is not depicted in FIG. 2, as Ni and Au form a solid solution across their compositional gradient, and no Ni/Au intermetallics exist.

Figure 3:
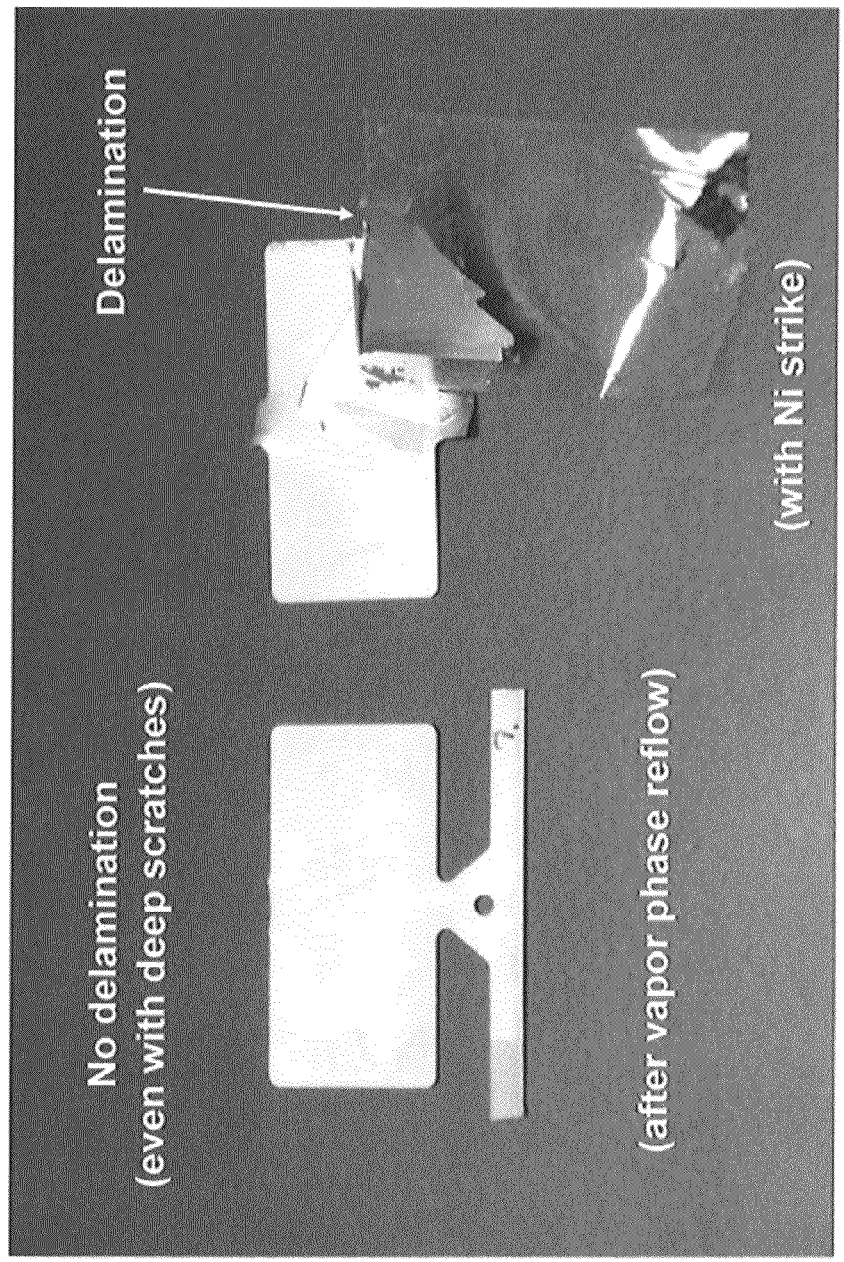
FIG. 3 depicts a comparison of flat test coupons test results prepared in accordance with the prior art and prepared using the vapor phase reflow operation of the present invention.

A finished contact 30 heat treated in accordance with a prior art method will exhibit regions that include stannous oxide. This stannous oxide exists even though prior art techniques utilize methods to minimize the formation of stannous oxide. The stannous oxide sites are detrimental to the interdiffusion of Sn and Ni atoms necessary for the formation of intermetallics, the stannous oxide regions acting as diffusion barriers, and preventing the formation of intermetallics in these regions, both in situ and when subjected to elevated heat treatment temperatures. These regions also serve as sites for delamination initiation. Flat test coupons prepared to compare processing in accordance with the present invention and processing in accordance with prior art practices are depicted in FIG. 3. As can be seen, the coupons prepared using the vapor phase reflow method (left) do not exhibit delamination, while those processed using the prior art methods (right) and tested exhibit unacceptable delamination. Tests were performed in accordance with ASTM D3359, Standard Test Methods for Measuring Adhesion by Tape and ASTM B571, Standard Test Methods for Adhesion of Metallic Coatings (Bend Tests).

The processing of the present invention advantageously is adaptable to continuous processing. The copper substrate may be provided on reels and the reels may be processed continuously through various baths prior to being sent through vapor phase tin reflow operation. After being processed through vapor phase tin reflow operations, the plated contacts may then be processed onto a reel to await formation into contacts.

Figure 4:
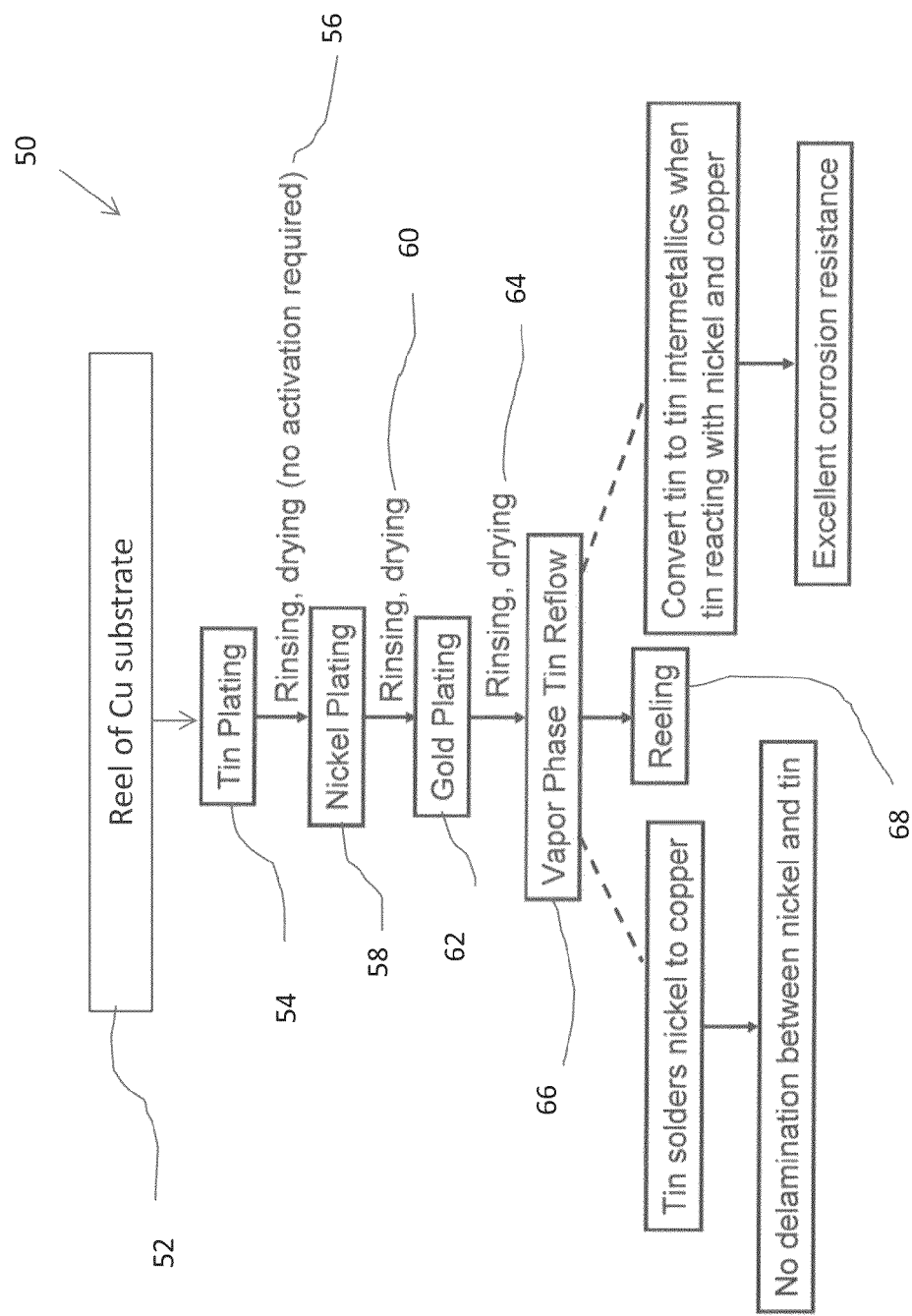
FIG. 4 is a flow chart depicting the processing steps of the present invention.

FIG. 4 depicts the process 50 for providing finished contacts 20 in accordance with the present invention. A reel of Cu substrate 12 strip is provided, step 52. Preferably, Cu substrate 12 is provided in a clean condition, that is, free of oil, dirt and contaminants. If it is not so provided, a cleaning and/or degreasing step may be performed immediately prior to providing the reel, such as by running the strip through a cleaning and/or degreasing operation. Sn plating is then applied over the Cu substrate strip, step 54. This preferably is accomplished by passing the Cu substrate through a Sn plating bath. Preferably, the Sn is applied to a thickness of from 5-50 microinches (0.000005-0.000050 inches). The Sn-plated substrate is then rinsed and dried, step 56. No activation of the Sn surface is required, but may be performed as an optional step if desired. Prior art activation steps utilize any one of 5-10% sulfuric acid, 5% nitric acid, 15% methane sulfonic acid or Ni-sulfamate acid bath, and should provide adequate activation, if required. Ni plating is then applied over the Sn-plated substrate, step 58. This preferably is accomplished by passing the Sn-plated substrate through a Ni plating bath. Preferably, the Ni is applied to a thickness of from 30-150 microinches (0.00030-0.000150 inches). The ratio of thickness of Ni to Sn (Ni/Sn) is preferably in the range of 10/1 to 1.1/1, that is, the Ni desirably is thicker than Sn The NiSn-plated substrate is then rinsed and dried, step 60. Au plating is then applied over the NiSn-plated substrate, step 62. This preferably is accomplished by passing the NiSn-plated substrate through an Au plating bath. Preferably, the Au is applied to a thickness of from 5-300 microinches (0.000005-0.000300 inches), but preferably from about 5-50 microinches (0.000005-0.000050 inches). The AuNiSn plated substrate is then rinsed and dried, step 64.

The plated substrate is then run through a continuous vapor phase reflow operation, step 66, preferably using PFPE fluids having vapor temperatures of either 240° C. or 260° C., both temperatures being above the melting point of Sn, which is 231.8° C. (449.4° F.). After the vapor phase reflow operation, the finish-plated contact strip is then reeled, step 68. Any additional cleaning steps may be performed before reeling, but the finish plated contact strip may be cleaned prior to cutting into final shape.

While plating preferably is accomplished with plating baths as set forth above, plating may be accomplished using any known plating techniques. Plating that can be applied using continuous processes are preferred. The rinsing and drying steps preferably are accomplished using deionized water and compressed air. The compressed air may be hot, warm or cold.

Vapor phase Sn reflow involves heating the plated copper substrate to the vaporization temperature of the PFPE fluid. The temperature selected will be above the melting point of the tin plating. The melting point of stannous oxide is about 1630° C. (2960° F.) so that the stannous oxide will survive the vapor phase reflow. However, once the tin substrate liquefies, the substrate support for the stannous oxide no longer exists, causing the thin stannous oxide layer to break up and be incorporated into the tin or into the Ni—Sn intermetallic. Whatever the final form, the stannous oxide layer no longer forms an identifiable region on the surface of Sn that inhibits diffusion of Ni and Sn, so that a continuous Ni—Sn intermetallic forms at the interface of the nickel layer and the tin layer. The structure formed in this manner appears to form a strong metallurgical bond that is not susceptible to delamination.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A process for manufacturing a plated contact, comprising the steps of:
   providing a metallic substrate;
   applying a tin plating to the metallic substrate;
   rinsing and drying the tin-plated substrate;
   applying a nickel plating over the tin-plating;
   rinsing and drying the nickel/tin plated substrate;
   applying a gold plating over the nickel plating;
   rinsing and drying the gold/nickel/tin plated substrate; and
   vapor phase reflowing the gold/nickel/tin plated substrate at a predetermined temperature above the melting point of tin;
   wherein the vapor phase reflowing forms an intermetallic lamina of metal substrate/tin at the metal substrate/tin interface and an intermetallic lamina of nickel/tin at the nickel/tin interface;
   wherein the step of vapor phase reflowing that heats the tin plating to a temperature above the melting point of tin eliminates a layer of stannous oxide on a surface of the tin; and
   wherein the contact is resistant to delamination after vapor phase reflowing.

2. The process of claim 1 wherein vapor phase reflowing heats the plated contact to 240° C.

3. The process of claim 1 wherein vapor phase reflowing heats the plated contact to a temperature in the range of 240° C. to 260° C.

4. The process of claim 1 wherein the step of vapor phase reflowing utilizes a perfluorinated fluid as the vapor phase fluid.

5. The process of claim 4 wherein the step of vapor phase reflowing utilizing a perfluorinated fluid includes using perfluoropolyether having a vaporization temperature of 240° C. or 260° C.

6. The process of claim 1 wherein the step of tin plating applies tin over the substrate to a thickness of 5 to 130 μin.

7. The process of claim 1 wherein the step of nickel plating applies nickel to a thickness of 30 to 150 μin.

8. The process of claim 1 wherein the substrate comprises copper.

9. A process for manufacturing a plated contact, comprising the steps of:
provided a metallic substrate;
applying a tin plating to the metallic substrate;
rinsing and drying the tin-plated substrate;
applying a nickel plating over the tin-plating;
rinsing and drying the nickel/tin plated substrate;
applying a gold plating over the nickel plating;
rinsing and drying the gold/nickel/tin plated substrate; and
vapor phase reflowing the gold/nickel/tin plated substrate at a predetermined temperature;
wherein the vapor phase reflowing forms an intermetallic lamina of metal substrate/tin at the metal substrate/tin interface and an intermetallic lamina of nickel/tin at the nickel/tin interface;
wherein the step of forming an intermetallic lamina includes forming an intermetallic lamina free of regions of stannous oxide at the interface between the nickel and the tin and between the nickel and nickel-tin intermetallic; and
wherein the contact is resistant to delamination after vapor phase reflowing.

10. The process of claim 1 wherein the step of vapor phase reflowing at a predetermined temperature includes heating the plated contact to a temperature above the melting point of tin.

11. The process of claim 10 wherein vapor phase reflowing heats the plated contact to 240° C.

12. The process of claim 10 wherein vapor phase reflowing heats the plated contact to a temperature in the range of 240° C. to 260° C.

13. The process of claim 9 wherein the step of vapor phase reflowing utilizes a perfluorinated fluid as the vapor phase fluid.

14. The process of claim 13 wherein the step of vapor phase reflowing utilizing a perfluorinated fluid includes using perfluoropolyether having a vaporization temperature of 240° C.

15. The process of claim 13 wherein the step of vapor phase reflowing utilizing a perfluorinated fluid includes using perfluoropolyether having a vaporization temperature of 260° C.

16. The process of claim 9 wherein the step of tin plating applies tin over the substrate to a thickness of 5 to 130 μin.

17. The process of claim 9 wherein the step of nickel plating applies nickel to a thickness of 30 to 150 μin.

18. The process of claim 9 wherein the step of gold plating applies gold to a thickness of 5 to 50 μin.

19. The process of claim 9 wherein the substrate comprises copper.

20. The process of claim 9 wherein the steps of rinsing and drying the applied plating utilize deionized water for rinsing and compressed air for drying.

* * * * *